United States Patent

Oyama

[11] Patent Number: 5,115,591
[45] Date of Patent: May 26, 1992

[54] FISHING ROD

[75] Inventor: Mitsuyoshi Oyama, Tokyo, Japan

[73] Assignee: Daiwa Seiko, Inc., Tokyo, Japan

[21] Appl. No.: 512,361

[22] Filed: Apr. 23, 1990

[51] Int. Cl.⁵ .............................................. A01K 87/06
[52] U.S. Cl. ................................................ 43/22
[58] Field of Search .................................. 43/22, 23

[56]  References Cited
U.S. PATENT DOCUMENTS

| | | | |
|---|---|---|---|
| 1,980,316 | 11/1934 | Breder | 43/22 |
| 2,592,878 | 4/1952 | Esposito | 43/22 |
| 4,535,561 | 8/1985 | Hlava | |
| 4,578,890 | 4/1986 | Childre | 43/22 |
| 4,646,460 | 3/1987 | Rumbaugh | 43/22 |
| 4,653,215 | 3/1987 | Strader | 43/22 |
| 4,756,114 | 7/1988 | Ohmura | 43/22 |
| 4,821,447 | 4/1989 | Nakayama | 43/22 |
| 4,864,764 | 9/1989 | Yamato | 43/22 |
| 4,891,899 | 1/1990 | Wulff | 43/22 |
| 4,903,427 | 2/1990 | Yamato | 43/22 |

FOREIGN PATENT DOCUMENTS

| | | | |
|---|---|---|---|
| 744912 | 10/1966 | Canada | 43/22 |
| 54-488 | 1/1979 | Japan | |
| 60-19435 | 1/1985 | Japan | |

Primary Examiner—Kurt Rowan
Attorney, Agent, or Firm—Longacre & White

[57] ABSTRACT

A fishing rod is disclosed which comprises a handle securely fixed to one end of a fishing rod and provided with a fixed hood, a reel mounting portion and a cylindrical male screw in this order, an engagement grip threadedly engaged with the cylindrical male screw and movable therealong, a movable hood slidingly moved only in the axial direction of the handle and kept in contact with the engagement grip, and a cover cylinder attached onto the movable hood and surrounding an outer portion of the handle except for the reel mounting portion and the fixed hood.

16 Claims, 3 Drawing Sheets

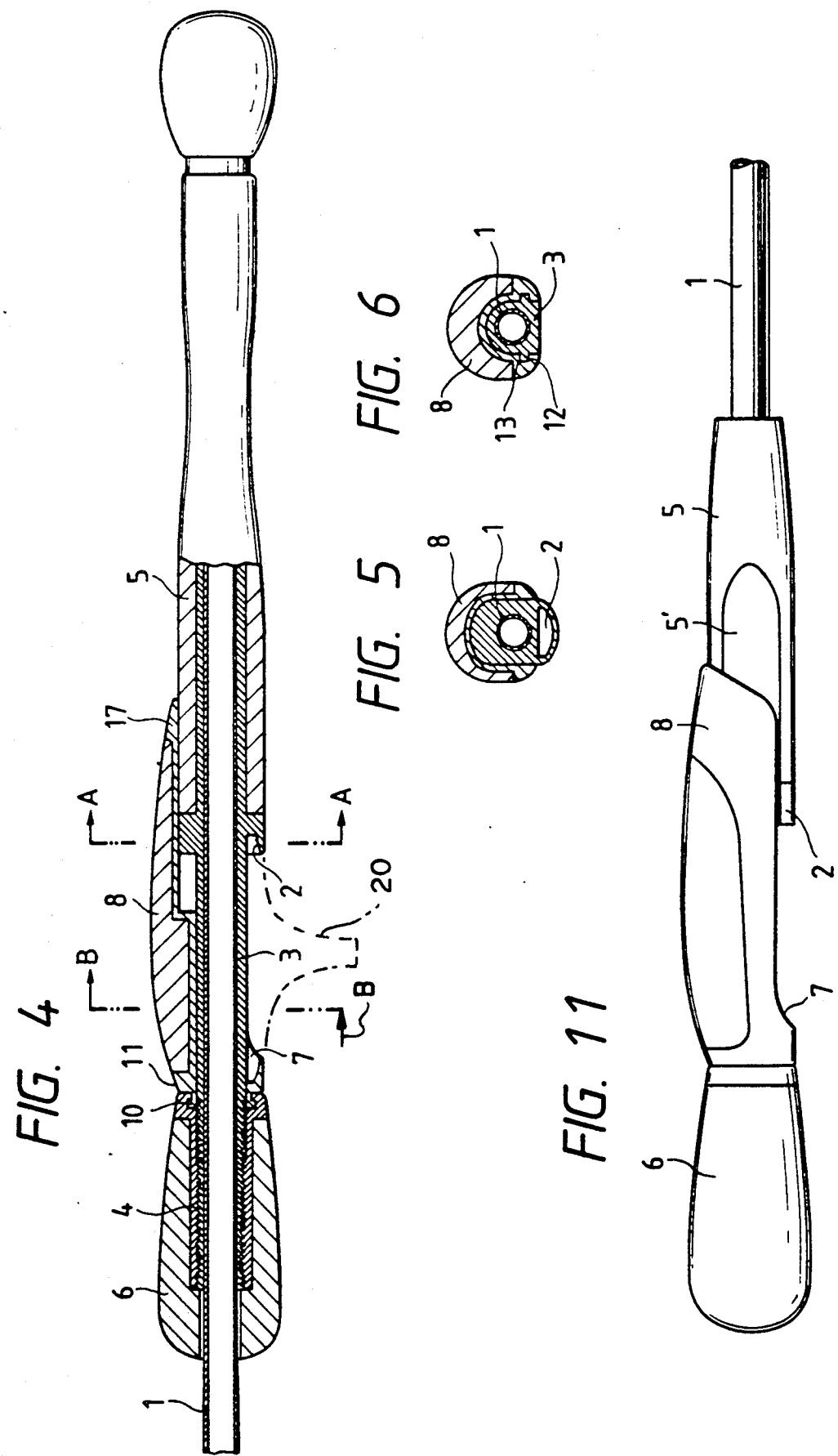

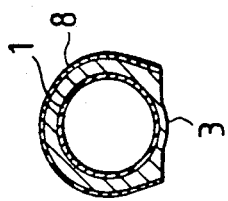
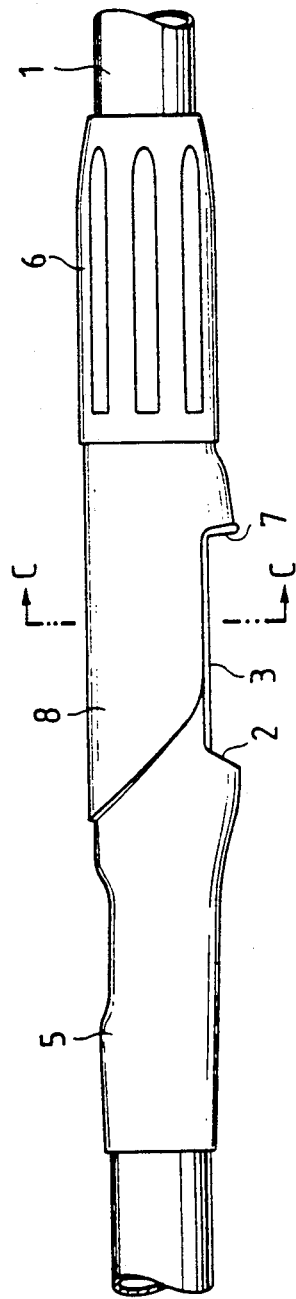
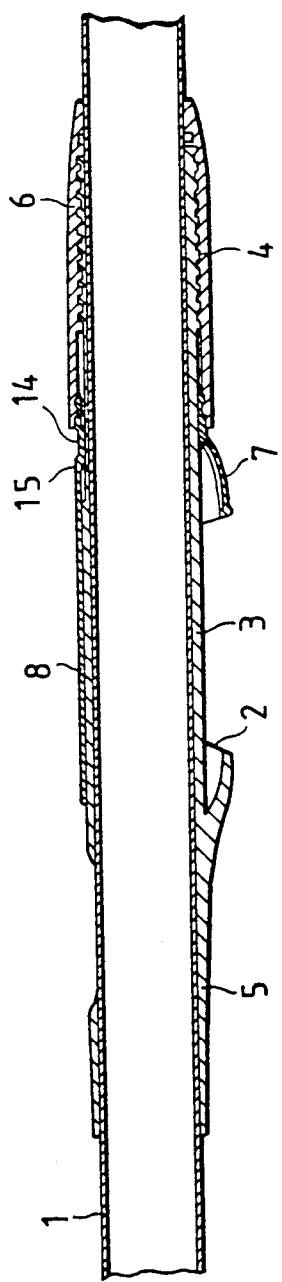
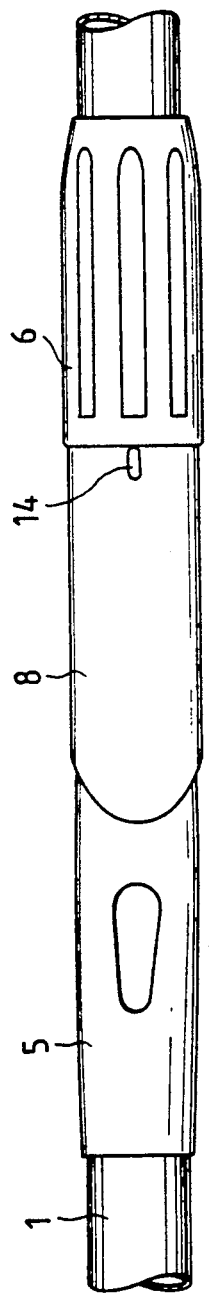

FISHING ROD

BACKGROUND OF THE INVENTION

This invention relates to an improvement for a mounting portion of a fishing rod onto which a fishing reel is to be mounted.

In the prior art, it is proposed to provide a handle in a reel mounting portion of a fishing rod. However, since undesired steps or gaps are likely to occur in a movable hood portion of a reel mounting portion of a fishing rod, a fisherman's grip feeling of a reel mounting portion of a handle is results in deterioration. Thus, there is a fear that the fishing rod and reel could not be smoothly operated.

In order to eliminate this fear, it is proposed by the Japanese Utility Model Unexamined Publication No. 54-488 to provide a fishing rod having a front grip cylinder fixed to the fishing rod and a detachable and movable rear grip cylinder. When a fishing reel having a mounting leg in the form of T-shape is to be mounted on the fishing rod, the front and rear cylinders come into contact with each other at a portion where the mounting leg extends vertically so as to fix the reel onto the rod.

It is also proposed by the Japanese Patent Unexamined Publication No. 60-19435 to provide a fishing rod with a front grip having a fixed hood and with a rear grip having a movable hood. In this proposal, the front grip includes a cover cylinder having an insertion opening for a reel mounting leg, and the cover cylinder is formed at a rear portion of the front grip. The movable hood of the rear grip is disposed within the cover cylinder of the front grip. The rear grip is threadedly and movably engaged with the front grip so as to fix the reel onto the rod by their hoods.

However, these proposals also suffer from problems

In the former case, if the size of the mounting leg of the fishing reel is unsuitable for the rod, particularly for the front and rear cylinders, then an undesired gap is formed between the front and rear cylinders since the rear cylinder cannot come into contact with intimate contact with the front cylinder. As a result, it is difficult for a fisherman to well hold the fishing rod. Further, the construction for moving and fixing the rear cylinder is complicated.

On the other hand, in the latter case, since the rod is constructed in such a manner that the movable hood provided in the rear grip is disposed within the cover cylinder, the fisherman cannot directly hold a portion of the rear grip, where the movable hood is provided. For this construction, the fixing of the front and rear grips is dependent only upon the threaded engagement of the front and rear grips, so that it is likely to rotate the rear grip in use. As a result, the engagement for fixing the reel to the rod is likely to be loose.

SUMMARY OF THE INVENTION

It is, therefore, an object of the present invention to provide a fishing rod including a handling portion where a fishing reel can be mounted without any step, gap or looseness.

In order to attain the above-noted and other object of the present invention, the fishing rod according to the present invention comprises: a handle rigidly attached to one end of a fishing rod, the handle having a fixed hood, a reel mounting portion and a cylindrical male screw in this order; an engagement grip threadedly engaged with the cylindrical male screw and movable therealong; a movable hood slidingly moved only in the axial direction of the handle and held in contact with the engagement grip; and a cover cylinder surrounding an outer portion of the handle except for the reel mounting portion and the fixed hood.

The handle may be positioned at the middle portion of the fishing rod rather than the end portion thereof.

The fixed hood, the reel mounting portion and the cylindrical male screw may be arranged in series from a proximal end of the fishing reel, or otherwise may be arranged in series in opposite direction.

BRIEF DESCRIPTION OF THE DRAWINGS

In the accompanying drawings

FIG. 4 is a partially fragmentary, frontal view of the fishing rod;

FIG. 5 is a cross-sectional view taken along the line A—A of FIG. 4;

FIG. 6 is a cross-sectional view taken along the line B—B of FIG. 4;

FIG. 7 is a frontal view showing fishing rod according to another embodiment of the present invention;

FIG. 8 is a longitudinal sectional view of the fishing rod shown in FIG. 7;

FIG. 9 is a top plane view of the fishing rod shown in FIG. 7;

FIG. 10 is a cross-sectional view taken along the line C—C of FIG. 7; and

FIG. 11 is a frontal view showing a fishing rod according to yet another embodiment of the present invention, in which an engaging grip is provided at a proximal end of the rod.

DETAILED DESCRIPTION OF THE PREFERRED EMBODIMENTS

Figure 1:
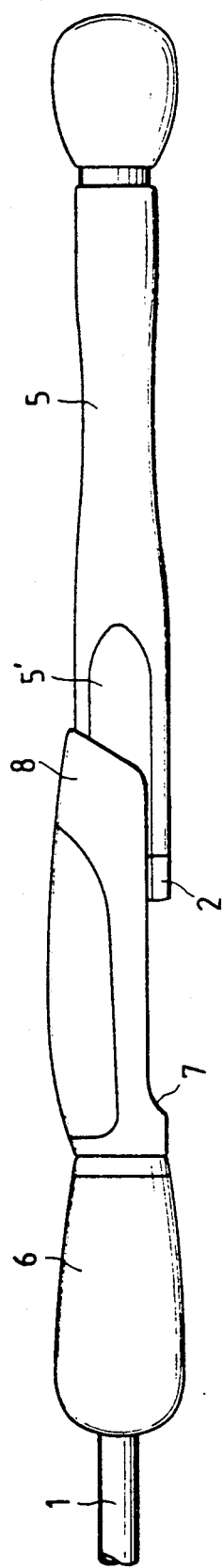
FIG. 1 is a frontal view showing a fishing rod according to an embodiment of the present invention.

Preferred embodiments of the present invention is hereinafter described in detail with reference to the accompanying drawings.

A first embodiment of the present invention is described with reference to FIG. 1 through FIG. 6.

A fishing rod 1 is provided at its proximal end with a handle 5, in which a fixed hood 2, a reel mounting planar portion 3 and a cylindrical male screw 4 are integrally formed in series toward a free end of the fishing rod 1. The handle 5 is rigidly fixed to the fishing rod 1. The fishing rod 1 is further provided with an engaging grip 6 a female screw of which is provided on its inner surface. The engaging grip 6 is threadedly engaged with the cylindrical male screw 4 and is movable along the handle 5.

A movable hood 7 and a sliding member 17 are integrally formed with each other and provided around an outer surface of the handle 5. The movable hood 7 is kept in contact with the engaging grip 6 by contact portions 10 and 11 provided at end portions of the engaging grip 6 and sliding member 17, respectively.

Figure 3:
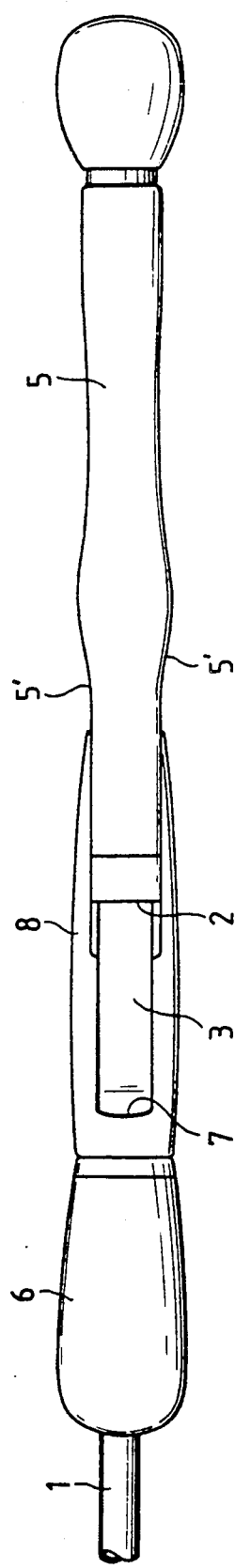
FIG. 3 is a rear view of the fishing rod.

A cover cylinder 8 is attached onto the sliding member 17 so as to surround a portion of the handle 5 where a fishing reel T shaped leg 20 is to be mounted, but the movable hood 7, the reel mounting portion 3 and the fixed hood 2 are exposed, as best shown in FIGS. 1 and 3.

A rotational movement of the movable hood 7 and the cover cylinder 8 attached onto the sliding member 17 is restricted by a spline 12 provided in the handle 5 and a spline groove 13 provided in a sliding member as shown in FIG. 6. In other words, by the action of the contact portions 10 and 11, the spline 12 and the spline groove 13, the movable hood 7 and the cover cylinder 8 attached onto the sliding member 17 are moved in the axial direction of the handle 5 but are prevented from rotating.

In the above-construction, the fixed hood 2, the reel mounting portion 3, the cylindrical male screw 4 and the movable hood 7 are preferably made of hard synthetic resin, metal or the like. On the other hand, the handle 5, the engaging grip 6 and the cover cylinder 8 are preferably made of foamed synthetic resin, soft synthetic resin, natural cork or the like so as to achieve easy holding.

Figure 2:
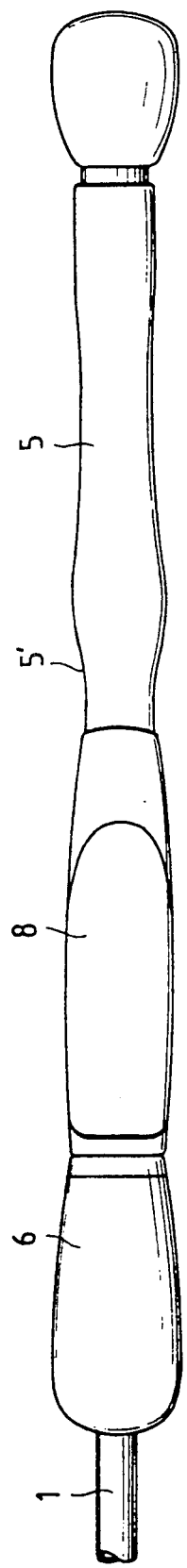
FIG. 2 is a top plane view of the fishing rod.

As shown in FIGS. 1 through 3, it is also preferable to form a reduced diameter portion 5' so as to hold the cover cylinder 8 easily and minimize the size thereof. For the same reasons, the cover cylinder 8 may have a convex curved surface.

A second embodiment of the present invention hereinafter described with reference to FIGS. 7 through 10.

In this embodiment, a handle 5 is positioned at a middle portion of a fishing rod 1. A handle 5, a fixed hood 2, a reel mounting portion 3 and a cylindrical male screw 6 are made of the same material and integrally formed with each other. An engaging grip 6 is directly engaged with the cylindrical male screw 4.

As is apparent from FIG. 10, in this embodiment, the rotational movement of the cover cylinder 8 and the movable hood 7 are restricted by the cross-sectional shape of the cover cylinder 8. In other words, the non-circular shape in cross section prevents the movable hood 7 and the cover cylinder 8 from rotating.

Further, as shown in FIGS. 8 and 9, the cover cylinder 8 and the handle 5 are provided with a spline 14 and a spline groove 15, respectively, so as to restrict the rotational movement of the cover cylinder 8 and the movable hood 7 in cooperation with the action of the non-circular shape of the cover cylinder 8.

The fixed hood, the reel mounting portion and the cylindrical male screw may be arranged in series from a proximal end of the fishing reel, or otherwise may be arranged in series in opposite direction.

According to the present invention, since the engaging grip is kept in contact with the cover cylinder integrally attached to the sliding member having the movable hood and the cover cylinder attached to the movable hood surrounds the handle except for the reel mounting portion and the fixed hood, any undesired step or gap is not formed in the fishing rod a portion of which is held by the fisherman. Therefore, it is easy to hold the portion onto which the reel is mounted and to attain the smooth fishing operation. Particularly, since fishing operation can be performed while securely holding the reel fixed to the reel mounting portion and the cover, both rotations of which are prevented, the engaging grip is surely prevented from being loosened, so that the fisherman does not suffer from an unsteady fishing reel.

What is claimed is:

1. A fishing rod onto which a fishing reel is to be mounted, said fishing reel having a T-shaped leg for use with the attachment of said fishing rod, said fishing rod comprising:

a handle rigidly attached to said fishing rod, said handle including a first hood for supporting one end of said leg, said first hood being fixed to said handle, a reel mounting portion where said reel is to be mounted and a cylindrical male screw, said first hood, said reel mounting portion and said cylindrical male screw being arranged in this order in said handle;

an engaging grip engaged with said cylindrical male screw and movable along said handle;

a second hood for supporting the other end of said leg, said second hood being kept in contact with said engaging grip, said second hood being slidingly and non rotatably movable relative to said rod in the axial direction of said handle; and a cover cylinder surrounding a portion of said handle except for said reel mounting portion and said first hood, and extending from said second hood beyond said first hood, said cover cylinder being movable relative to said rod in conjunction with the sliding movement of said second hood, wherein said cover cylinder entirely and broadly covers the portion of the handle that is opposite said reel mounting position and is coincident with where a fisherman's hand grasps said rod.

2. The fishing rod according to claim 1, further comprising:

engaging means for keeping said second hood in contact with said engaging grip.

3. The fishing rod according to claim 2, wherein said engaging grip is freely rotated with respect to said second hood by the action of said engaging means.

4. The fishing rod according to claim 1, further comprising:

restriction means for restricting a movement of said second hood in a state that said second hood is slidingly moved only in the axial direction of said handle.

5. The fishing rod according to claim 1, wherein said first hood, said reel mounting portion and said cylindrical male screw are arranged in series from a side of a proximal end of said rod.

6. The fishing rod according to claim 1, wherein said first hood, said reel mounting portion and said cylindrical male screw are arranged in series from a side of a free end of said rod.

7. The fishing rod according to claim 1, wherein said handle is provided at a proximal end of said rod.

8. The fishing rod according to claim 1, wherein said handle is provided at a middle portion of said rod.

9. The fishing rod according to claim 1, wherein said second hood including a sliding member integrally formed with said second hood, said cover cylinder being attached onto said sliding member.

10. The fishing rod according to claim 4, wherein said restriction means includes non-circular shapes of said handle and said cover cylinder in section.

11. The fishing rod according to claim 4, wherein said restriction means includes a spline and a spline groove.

12. The fishing rod according to claim 1, wherein said cover cylinder extends longitudinally along and substantially completely surrounds a portion of said handle opposite said reel mounting portion thereby forming a grip.

13. A fishing rod onto which a fishing reel is to be mounted, said fishing reel having a T-shaped leg for use with the attachment of said fishing rod, said fishing rod comprising:

a handle rigidly attached to said fishing rod, said handle including a first hood for supporting one end of said leg, said first hood being fixed to said handle, a reel mounting portion where said reel is to be mounted and a cylindrical male screw, said first hood, said reel mounting portion and said cylindrical male screw being arranged in this order in said handle;

an engaging grip engaged with said cylindrical male screw and movable along said handle;

a cover cylinder surrounding a portion of said handle, where said reel is to be mounted, in a state that said reel mounting portion and said first hood are exposed, said cover cylinder being formed with a second hood for supporting the other end of said leg, said second hood being kept in contact with said engaging grip, said second hood being slidably movable relative to said rod only in the axial direction of said handle together with said cover cylinder;

engaging means for keeping said second hood in contact with said engaging grip; and restriction means for restricting the movement of said second hood in a state that said second hood is slidingly moved only in the axial direction of said handle, but is prevented from rotating.

14. The fishing rod according to claim 13, wherein said cover cylinder extends longitudinally along and substantially completely surrounds a portion of said handle opposite said reel mounting portion thereby forming a grip.

15. A reel seat adapted for use with a fishing rod onto which a fishing reel is to be mounted, in which said fishing reel includes a T-shaped leg for use with the attachment of said fishing rod, said reel seat comprising:

a handle rigidly attached to said fishing rod, said handle including a first hood for supporting one end of said leg, said first hood being fixed to said handle, a reel mounting portion where said reel is to be mounted and a cylindrical male screw, said first hood, said reel mounting portion and said cylindrical male screw being arranged in this order in said handle;

an engaging grip engaged with said cylindrical male screw and movable along said handle;

a second hood for supporting the other end of said leg, said second hood being kept in contact with said engaging grip, said second hood being slidably and non rotatably movable relative to said rod in the axial direction of said handle; and a cover cylinder surrounding a portion of said handle except for said reel mounting portion and said first hood, and extending from said second hood to beyond said first hood said cover cylinder being movable relative to said rod in conjunction with the movement of said second hood, wherein said cover cylinder entirely and broadly covers the portion of the handle that a fisherman's hand grasps opposite said reel mounting portion.

16. The fishing rod according to claim 13, wherein said cover cylinder extends longitudinally along and substantially completely surrounds a portion of said handle opposite said reel mounting portion thereby forming a grip.

* * * * *